(12) United States Patent
Legerton et al.

(10) Patent No.: US 7,097,301 B2
(45) Date of Patent: Aug. 29, 2006

(54) HYBRID CONTACT LENS SYSTEM AND METHOD

(75) Inventors: Jerome Legerton, San Diego, CA (US); Barry Chen, San Diego, CA (US); Ali Dahi, Carlsbad, CA (US)

(73) Assignee: SynergEyes, Inc., Carlsbad, CA (US)

( * ) Notice: Subject to any disclaimer, the term of this patent is extended or adjusted under 35 U.S.C. 154(b) by 0 days.

(21) Appl. No.: 10/657,061

(22) Filed: Sep. 5, 2003

(65) Prior Publication Data

US 2004/0046931 A1    Mar. 11, 2004

Related U.S. Application Data

(60) Provisional application No. 60/408,618, filed on Sep. 6, 2002.

(51) Int. Cl.
G02C 7/04    (2006.01)

(52) U.S. Cl. .............................. 351/160 H; 351/160 R (58) Field of Classification Search ............... 351/159, 351/160 R, 160 H, 163, 165–6, 172, 174, 351/177–8
See application file for complete search history.

(56) References Cited

U.S. PATENT DOCUMENTS

| | | | |
|---|---|---|---|
| 3,594,074 A | 7/1971 | Rosen | 351/219 |
| 3,876,581 A | 4/1975 | Neogi | 521/62 |
| 3,944,347 A | 3/1976 | Barkdoll et al. | 351/160 R |
| 3,973,838 A | 8/1976 | Page | 351/160 R |
| 4,121,885 A | 10/1978 | Erickson et al. | 351/177 |
| 4,166,255 A | 8/1979 | Graham | 351/160 H |
| 4,171,878 A | 10/1979 | Kivaev et al. | 351/160 R |
| 4,193,671 A | 3/1980 | Erickson et al. | 351/160 H |
| 4,208,362 A | 6/1980 | Deichert et al. | 264/1.7 |
| 4,248,989 A * | 2/1981 | Novicky | 526/264 |
| 4,701,288 A | 10/1987 | Cook et al. | 264/1.38 |
| 4,702,574 A | 10/1987 | Bawa | 351/162 |
| 4,869,587 A | 9/1989 | Breger | 351/161 |
| 4,874,561 A | 10/1989 | Spector | 264/1.1 |
| 5,114,628 A | 5/1992 | Hofer et al. | 264/1.37 |
| 5,371,147 A * | 12/1994 | Spinelli et al. | 525/288 |
| 5,422,687 A | 6/1995 | Tanaka et al. | 351/161 |

(Continued)

FOREIGN PATENT DOCUMENTS

GB    1417650    12/1975

(Continued)

OTHER PUBLICATIONS

Search Report in related European Application No. EP 03 79 4616 mailed Oct. 14, 2005.

*Primary Examiner*—Jordan M. Schwartz
*Assistant Examiner*—Jessica Stultz
(74) *Attorney, Agent, or Firm*—Knobbe Martens Olson & Bear LLP (57) ABSTRACT

A hybrid hard-soft contact lens is provided. Several embodiments of the invention include methods of coupling the hard and soft sections of the contact lens. Other embodiments of the invention include contact lens materials and coatings that increase oxygen transmission though the lens. Yet other embodiments of the invention are directed to cost-effective manufacturing methods of a hybrid hard-soft contact lens. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

29 Claims, 7 Drawing Sheets

U.S. PATENT DOCUMENTS

| | | | | |
|---|---|---|---|---|
| 5,433,898 A | 7/1995 | Thakrar et al. | ............... | 264/1.7 |
| 5,448,312 A | 9/1995 | Roffman et al. | ............ | 351/161 |
| 5,452,031 A | 9/1995 | Ducharme | .................. | 351/177 |
| 5,570,142 A | 10/1996 | Lieberman | ............... | 351/160 R |
| 5,643,249 A | 7/1997 | Amano | ........................... | 606/4 |
| 5,662,706 A | 9/1997 | Legerton et al. | ............ | 623/5.13 |
| 5,771,088 A | 6/1998 | Perrott | ........................ | 351/161 |
| 5,777,719 A | 7/1998 | Williams et al. | ............ | 351/212 |
| 5,800,532 A | 9/1998 | Lieberman | ............... | 623/6.236 |
| 5,800,744 A | 9/1998 | Munakata | .................... | 264/1.7 |
| 5,807,381 A | 9/1998 | Lieberman | ...................... | 606/5 |
| 5,835,192 A | 11/1998 | Roffman et al. | ............ | 351/246 |
| 5,872,613 A | 2/1999 | Blum et al. | ................... | 351/177 |
| 5,880,809 A | 3/1999 | Lieberman et al. | ...... | 351/160 R |
| 5,923,397 A | 7/1999 | Bonafini, Jr. | ............ | 351/160 R |
| 5,929,969 A | 7/1999 | Roffman | ..................... | 351/161 |
| 5,949,521 A | 9/1999 | Williams | .................... | 351/246 |
| 5,953,098 A | 9/1999 | Lieberman et al. | ........ | 351/16 R |
| 5,965,330 A | 10/1999 | Evans et al. | ................. | 430/231 |
| 5,986,001 A * | 11/1999 | Ingenito et al. | ............ | 521/134 |
| 6,043,328 A * | 3/2000 | Domschke et al. | .......... | 526/279 |
| 6,050,687 A | 4/2000 | Bille et al. | ................... | 351/212 |
| 6,082,856 A | 7/2000 | Dunn et al. | ............. | 351/160 H |
| 6,086,204 A | 7/2000 | Magnante | .................... | 351/212 |
| 6,095,651 A | 8/2000 | Williams et al. | ............ | 351/246 |
| 6,149,609 A | 11/2000 | Lieberman et al. | ......... | 600/587 |
| 6,199,986 B1 | 3/2001 | Williams et al. | ............ | 351/221 |
| 6,234,631 B1 | 5/2001 | Sarver et al. | ................ | 351/212 |
| 6,241,355 B1 | 6/2001 | Barsky | ........................ | 351/177 |
| 6,270,221 B1 | 8/2001 | Liang et al. | ................. | 351/221 |
| 6,271,914 B1 | 8/2001 | Frey et al. | ................... | 356/124 |
| 6,271,915 B1 | 8/2001 | Frey et al. | ................... | 356/124 |
| 6,280,435 B1 | 8/2001 | Odrich et al. | ................... | 606/5 |
| 6,305,802 B1 | 10/2001 | Roffman et al. | ............ | 351/212 |
| 6,325,509 B1 | 12/2001 | Hodur et al. | ............ | 351/160 R |
| 6,338,559 B1 | 1/2002 | Williams et al. | ............ | 351/212 |
| 6,340,229 B1 | 1/2002 | Lieberman et al. | ..... | 351/160 R |
| 6,379,005 B1 | 4/2002 | Williams et al. | ............ | 351/211 |
| 6,379,008 B1 | 4/2002 | Chateau et al. | ............. | 351/247 |
| 6,412,946 B1 | 7/2002 | Vijfvinkel et al. | ...... | 351/160 R |
| 6,416,179 B1 | 7/2002 | Lieberman et al. | ......... | 351/212 |
| 6,540,353 B1 | 4/2003 | Dunn | ......................... | 351/161 |
| 6,599,285 B1 | 7/2003 | Lieberman et al. | ......... | 606/5 |
| 2003/0123024 A1 | 7/2003 | Dunn | ..................... | 351/160 R |

FOREIGN PATENT DOCUMENTS

| | | |
|---|---|---|
| JP | 04-045420 | 2/1992 |
| WO | WO 94-06621 | 3/1994 |
| WO | WO 01/28410 A1 | 4/2001 |
| WO | WO 01/89424 A1 | 11/2001 |
| WO | WO 02/30273 A1 | 4/2002 |

* cited by examiner

STEP 1

STEP 4

STEP 2

STEP 5

STEP 3

STEP 6

HYBRID CONTACT LENS SYSTEM AND METHOD

Priority is claimed to U.S. Provisional Application Ser. No. 60/408,618, filed Sep. 6, 2002, titled "Hybrid Contact Lens System and Method," which is incorporated herein by reference in its entirety.

FIELD OF THE INVENTION

The present invention generally relates to contact lenses. More particularly, the invention concerns a hybrid hard-soft contact lens.

BACKGROUND OF THE INVENTION

Vision correction is on the verge of a revolution. New technologies to measure the aberrations or distortions in the optics of the eye will soon be available to the public. These new wavefront measurement techniques such as Shack-Hartmann wavefront sensing or Talbot Interferometry can precisely measure the eye's aberrations so that vision may be corrected up to 20/10. Wavefront sensing is the method for rapidly, and very accurately, assessing the aberrations in an individual's eye to create a customized prescription for correction.

However, once the eye's aberrations have been measured, either by conventional methods or by wavefront sensing, these measurements must then be transferred into a vision correction system, such as eye surgery, spectacles, or contact lenses. Recent advances in laser refractive surgery techniques such as LASIK and photorefractive keratectomy, as well as improvements in spectacle lens manufacturing now enable the creation of highly accurate corrective prescriptions for individuals.

However, this is not the case with contact lenses. Popular soft contact lenses cannot achieve the same result as spectacles or laser refractive surgery because of dimensional variations in fabrication. Hard contact lenses, which may provide the platform to achieve the results of spectacles, are not as comfortable as soft contacts and lack the necessary positional stability on the eye.

Therefore, there exists a need for a hybrid hard-soft contact lens that can provide a platform for a corrective prescription and also provide the comfort of soft contact lenses.

SUMMARY OF THE INVENTION

A hybrid hard-soft contact lens is provided. Several embodiments of the invention include methods of coupling the hard section of the lens to the soft section of the lens. Other embodiments of the invention include contact lens materials that increase oxygen transmission though the lens. Yet other embodiments of the invention are directed to cost-effective manufacturing methods of a hybrid hard-soft contact lens.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is based on a hybrid contact lens platform that offers the benefits, without the disadvantages, of both soft and gas permeable contact lenses-comfort, health, stability, superior optics and durability. The features of the present invention include lens chemistry, manufacturing processes, optical design and prescribing and fitting processes. One feature of the manufacturing processes and optical design elements is the ability to make quarter wavelength customization in order to correct for the higher order refractive aberrations that limit one's ability to see better than 20/20.

Unless defined otherwise, all technical and scientific terms used herein have the same meaning as is commonly understood by one of skill in the art to which this invention belongs. In event the definition herein is not consistent with definitions elsewhere, the definitions set forth herein will control. As used herein, "hybrid" refers to a type of contact lens that includes both hard and soft lens elements.

One embodiment of the present invention will correct normal ametropic errors (myopia, hyperopia and astigmatism) to a higher degree of visual performance than conventional contact lenses. Another embodiment of the present invention will correct for the wavefront-guided higher order aberrations and will create a new contact lens category, providing "super vision" for those whose visual requirements demand better than 20/20 acuity. Yet another embodiment of the present invention will correct for presbyopia, the gradually increasing inability to focus at close distances that usually begins after age 40. Other embodiments of the present invention may include contact lenses that incorporate several, or all of the above-described features.

Another embodiment of the present invention is a hybrid lens that combines the optical clarity, stability and durability of a gas permeable lens with the comfort of a soft contact lens. This hybrid lens has a gas permeable center chemically bonded to a soft outer skirt. The center is highly oxygen permeable, which is important to maintaining corneal health. One of the manufacturing processes of the present invention enables this gas permeable center to be lathed to quarter wavelength precision, allowing corrections of wavefront-guided higher order refractive aberrations and providing visual performance better than 20/20.

Yet another embodiment hybrid contact lens of the present invention has a soft outer skirt with a radius of curvature greater than the base curve of the oxygen permeable center, which is suspended on the soft skirt, thus creating a lighter touch above the corneal apex. One feature of this embodiment is that the eyelid force of normal blinking creates a peristaltic-like pump that exchanges the tears under the lens, contributing to overall comfort, and eliminating dryness, the most frequent complaint of contact lens wearers. Another feature of this embodiment is that the tear layer under the lens is not only important for comfort and health, but it has optical correction qualities as well. A layer of tears retained behind the base curve of the gas permeable lens of the present invention may correct corneal astigmatism by up to about ten diopters. Thus, a hybrid contact lens constructed according to the present invention creates a superior astigmatism correcting capability that does not rely on orientation and positioning, as do soft contact lenses.

Another embodiment of the present invention comprises a hybrid lens with a substantially rigid center that is chemically bonded to a softer outer skirt. One embodiment of the outer skirt is comprised of a modified HEMA (poly-2-hydroxyethyl-methacrylate) material. The center is a substantially rigid gas permeable-type with a gas permeability DK value greater than 30. A preferred embodiment center would have a gas permeability DK value of about 150. However, other embodiments may have a gas permeability DK value that may range between about 30 to about 250. In a preferred embodiment of the present invention, the substantially rigid center is made from any of the following materials: fluoro-siloxane acrylate, siloxane acrylate, or polystryene siloxane acrylate.

The substantially rigid center section may have a thickness that may range between about 0.03 millimeters (mm) to about 0.5 mm., and a diameter that may range between about 4.0 mm. to about 12.0 mm. The overall diameter of a hybrid contact lens constructed according to the present invention may range between about 10.0 mm. to about 18.0 mm.

The substantially rigid center may have a spherical or ellipsoidal ocular (i.e., eye-facing) surface. Unlike soft lenses, the substantially rigid center of the present invention contact lens is resistant to protein deposition. One feature of the present invention contact lens is that it is also highly resistant to foreign body migration as well as dislodgement from the eye during contact sports, or other vigorous activities. A contact lens constructed according to the present invention also provides excellent centering and vision correction for irregular corneas created by trauma or surgery.

Hybrid Contact Lens Geometry

One embodiment of the present invention comprises a central substantially rigid gas permeable portion having a posterior surface that is either spherical, aspherical or toroidal, which is chosen to approximate the overall toricity and sagittal depth of the cornea to be fitted. The rigid gas permeable portion may be optically clear with only the reduction in light transmission normally found in similar polymerized materials. In one embodiment the rigid portion contains colorants and additives that narrow the band of light transmitted by the lens to reduce the chromatic aberration of the lens-eye system. The anterior surface of the rigid portion may also have surface modification to correct the total low and high order aberrations of the lens-eye system. Further, the surface profile of the anterior surface may be modified to register the low and high order aberrations over the optical system of the eye to account for the consistent natural displacement of the contact lens when applied to the eye. In addition, the surface profile of the anterior surface may be modified to contain a multi-focal feature for the correction of presbyopia. Also, the anterior surface of the lens may be treated to reduce the variance in the pre-lens tear film.

In another embodiment of the present invention, the substantially rigid contact lens portion is joined to an outer soft hydrophilic portion by an intermediate adhesion enhancement zone. The adhesion enhancement zone may contain a material that bonds to the substantially rigid portion and to the soft hydrophilic portion. The soft hydrophilic portion may have a posterior surface that is spherical, aspherical, toroidal or rotationally asymmetrical to approximate the overall or meridional sagittal depth of the peripheral cornea, limbal region and sclera. The anterior surface of the soft portion may be modified to produce a thickness variation in the form of prism ballast or thin zones that utilize lid interaction to produce a resultant rotational stability.

The soft section or skirt of the contact lens is designed to control rotation by various methods. The methods include prism ballasting, thin zones, and rotationally asymmetrical contours that match the asymmetry of the cornea, limbus and sclera. In the preferred embodiment the superior portion of the lens is thinner than the inferior portion.

Methods of Manufacturing a Hybrid Contact Lens

Referring to FIGS. 1–5, one method of manufacturing a hybrid contact lens according to the present invention will now be described. This method results in a fracture resistant product that is inexpensive to manufacture.

Figure 1:
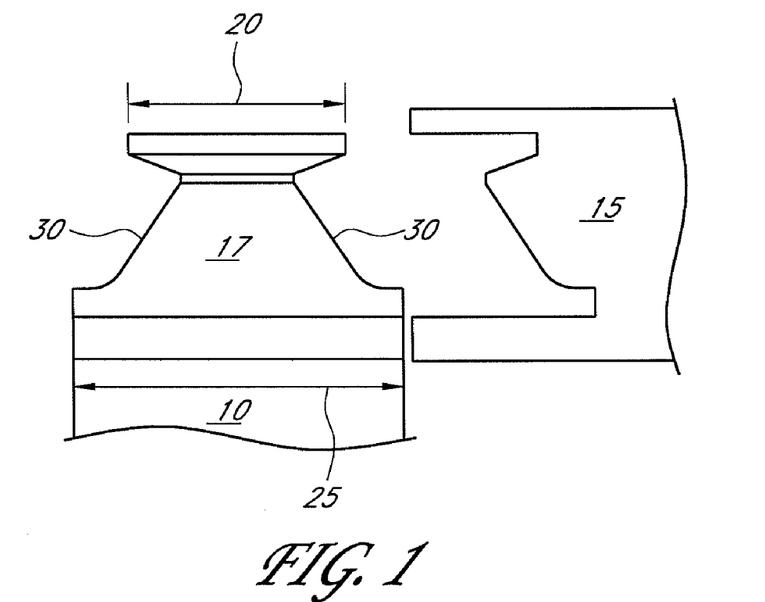
FIG. 1 is a front view of a manufacturing step used to construct a hybrid hard-soft contact lens of the present invention.

Shown in FIG. 1, a rod 10 of rigid gas permeable material is cast having the desired characteristics. Upon the completion of the curing the rod is precision ground to produce a substantially uniform diameter. The rod is then machined by tool 15 into a primary blank 17 having an anterior diameter 20 designed to conform to the collet of a computer numerically controlled lathe and a posterior diameter 25 designed to conform the outermost diameter of the hydrophilic portion of the lens for positioning in a tube, cup, or other containing device. The anterior diameter 20 may range from 6 millimeters (mm) to 24 mm, and the posterior diameter 25 may range from 6 mm to 24 mm. In one embodiment, the anterior diameter 20 may be a separate material that is bonded or otherwise attached to the primary blank 17 for enduring the clamping force of a lathe. The intermediate portion of the primary blank 17 is simultaneously machined to have a predetermined angle 30 for the interface of the rigid and hydrophilic material in the finished lens.

Figure 4:
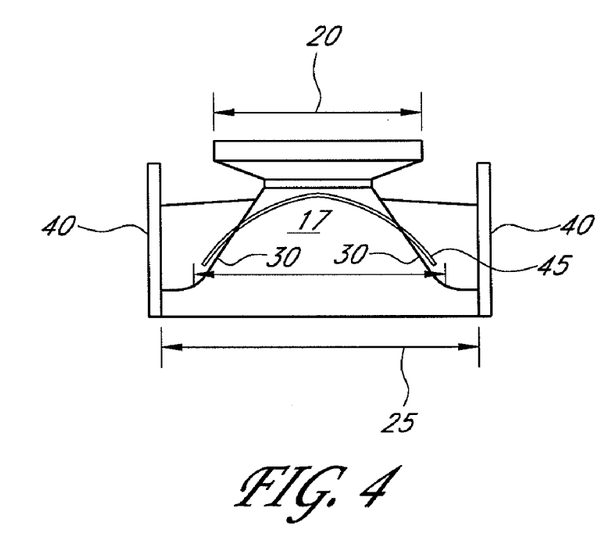
FIG. 4 illustrates another manufacturing step used to construct a hybrid hard-soft contact lens of the present invention.

One manufacturing method of the present invention has the posterior diameter 25 substantially meet, or exceed, the hydrophilic section outermost diameter 35, that is, the outermost diameter of the soft section of the contact lens, as shown in FIG. 4. In this embodiment, a boundary material 40 is then applied to produce a resultant wall, or cup to receive, and retain the hydrophilic liquid polymer. Alternatively, the primary blank 17 may be inserted into a cup, tube or other containing device to receive the hydrophilic material.

An alternative manufacturing method of the present invention includes the application of an adhesion promoter to the primary blank 17, followed by the casting of the hydrophilic polymer into the liquid holding device formed by either the boundary material 40, tube, cup or other containing device.

In yet another embodiment, the primary lens blank 17 is mounted via the anterior diameter 20 in the collet of a computer numerically controlled lathe that is programmed to produce the aspherical posterior surface profile in a manner that the profile does not require polishing, or may only need a light buff, or polish. The posterior surfaced button is then mounted to a lens block wherein the axis of the block passes through the geometric center of the lens 45, shown in FIG. 4.

The assembly with the posterior surfaced button is remounted in the collet of a computer numerically controlled lathe, such as the Optoform 80 with Variform attachment, or equivalent type that is capable of producing rotationally symmetrical or non-symmetrical surfaces to high, or quarter wavelength accuracy that preferably require a light buff, or no supplemental polishing (VARIFORM and OPTOFORM are trademarks of Precitech, Inc., of Keene, N.H.). It will be appreciated to those skilled in the art that other types of lathes may be employed. The finished lens is then removed from the lathe, with or without a light buff, deblocked and cleaned followed by anterior lens surface treatment. Finally the lens undergoes hydration-extraction, sterilization and packaging.

Alternative manufacturing methods of the present invention may include: molding of the posterior surface and diamond turning of the molded blank; contour cutting of the anterior surface of a posterior curve finished blank; etching the anterior surface of a posterior curve finished blank or predicate lens anterior surface; thin film deposition of a predicate lens anterior surface; and laser ablation of a predicate lens anterior surface.

Another manufacturing method may include molding or lathing a standard base curve with a standard or semi-customized front surface, then using a thermal or laser energy to modify the reflective index of the center material to a desired optical requirement. This method replaces custom lathing or molding expenses. Another method may include molding the posterior and anterior surfaces, and yet another embodiment may include a mechanical force or thermal molding manufacturing method.

Figure 5:
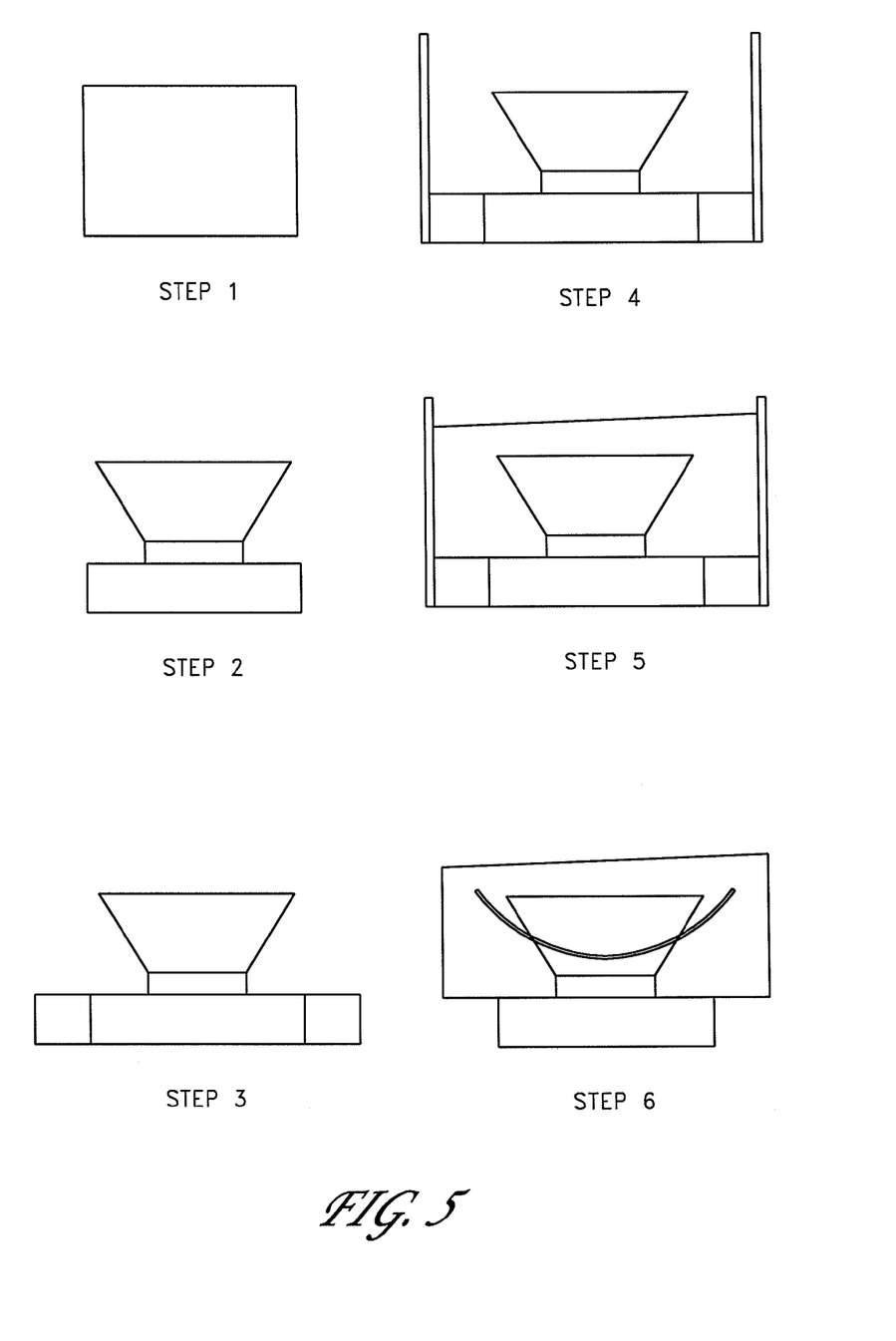
FIG. 5 illustrates an alternative manufacturing method of constructing a hybrid hard-soft contact lens of the present invention.

Another method of manufacturing a hybrid contact lens according to the present invention is illustrated in FIG. 5. Step 1 shows a rod of fluorosiloxane acrylate RGP material that will comprise the substantially rigid section of the hybrid contact lens. It will be appreciated to those skilled in the art that other types of materials may be employed. These other materials may include the following monomers, monomer mixtures, or their derivatives: trimeththylsiloxyl; methyl-methacrylate; ethyl-methacrylate; ethylene glycol di-methacrylate; octafluoro pentyl-methacrylate, tetra-methyldisiloxane, ethylene glycol di-methacrylate, pentafluoro phenylacrylate, 2-(trimethylsiloxyl) methacrylate, bis(2-metharyloxyphenyl) propane, N-[2-(N,N-dimethylamino) ethyl], onethacrylate, N-[2-(n,n-dimethylamino)ethy], meth-acryalte, vinylpyrolidone, N,N-dimathacrylamide, acrylamine, hydroxyethyl methacrylate, siloxane ethylene glycol di-methacrylate, trifluoroethyl methacrylate, pentafluorostyrene, pentafluoropropyl methacrylate, unsaturated polyester; p-vinyl benzyl hexafluoroisopropyl ether, and siloxanylalkylamide.

The rod, or button shown in Step 1 of FIG. 5, will preferably have a 5 millimeter (mm) to 22 mm diameter and be 2 mm to 15 mm in length. In one embodiment, the button may be bonded to another material for a subsequent operation, and as a possible cost saving. In Step 2, a plunge tool is used to remove unnecessary hard material and allow a solid section of material on one side for subsequent operations. Another method may use the plunge tool to form the button assembly from Step 1, with a shape similar to FIG. 2.

In Step 3, a spacer is formed on the gripping side of the blank for the next operation, or the blank can be bonded to a pre-form containing device to skip Step 4.

In Step 4, a tape, or other media that provides a retaining wall to hold the soft material during polymerization is applied to the blank. In Step 5, an adhesion promoter may be applied to the hard material and then the soft material is poured inside the retaining wall, or other containing device, and allowed to cure. In Step 6, the spacer, or containing device, is removed and the blank is ready for subsequent manufacturing operations.

Another method of manufacturing a hybrid contact lens according to the present invention comprises the use of a molded cup. In one embodiment, a pre-mold of a cup is created by using a bondable material that can be bonded by both hard and soft contact lens materials. This molded cup can be either usable in the finished lens or removed during the casting process. A preferred embodiment molded cup will have an optimized angle to maximize the bonding strength between the hard and soft contact lens materials. In addition, the molded cup may have a special gripping area for a subsequent lathing operation.

One method of manufacturing a molded cup of the present invention includes pouring a hard monomer to the open side of the cup and placing the cup under a pre-programmed curing environment. The cup is then placed over a plastic container for containing a soft monomer fluid. The soft monomer fluid is then poured to the open side of the plastic container and the assembly is placed under a pre-programmed curing environment. After the assembly is fully cured, it is ready to be lathed into a finished hybrid contact lens.

Another method of manufacturing a hybrid contact lens according to the present invention comprises a molded base curve cup. In one embodiment, a base curve cup is molded to include a base curve surface and an edge profile on a pre-determined diameter, with a soft monomer retaining wall on one side, and a special gripping area for subsequent lathing operations on the other side.

Yet another method of manufacturing a hybrid hard-soft contact lens of the present invention comprises using a molded base curve cup or fully-molded cup that has centering webs, or other indicators that ensure the device is centered. A pre-molded material separation cup is placed on either the base curve side of the cup or the front surface side of the cup, preferably to achieve a centering of a meeting area, or junction surface between the hard and soft contact lens materials.

Hard monomer is then poured in the center of the pre-molded material separation cup. The hard monomer will ultimately become the substantially rigid center second of the hybrid hard-soft contact lent. The assembly is then placed in a curing environment, and cured. Then soft monomer is poured into the area between the hard core material and the cup. The soft monomer is then cured, and then the assembly can be lathed to form a finished hybrid hard-soft contact lens, or the assembly may be molded so as to eliminate the need of subsequent lathing or machining.

Alternatively, this process may be reversed so that soft monomer can be poured into the outside of the material separation cup. The assembly is then placed in a curing environment, and then cured. Then hard monomer is poured into the area between the soft material separation cup and the cup. The hard monomer is then cured, and then the assembly can be lathed to form a finished hybrid hard-soft contact lens or the assembly may be molded so as to eliminate the need of subsequent lathing or machining.

Yet another molding method may be employed where both hard and soft monomer are poured together into a pre-mold cup, and then these two monomers are cured together and subsequently machined, or alternatively, a hard-soft contact lens is directly formed without machining.

Figure 6:
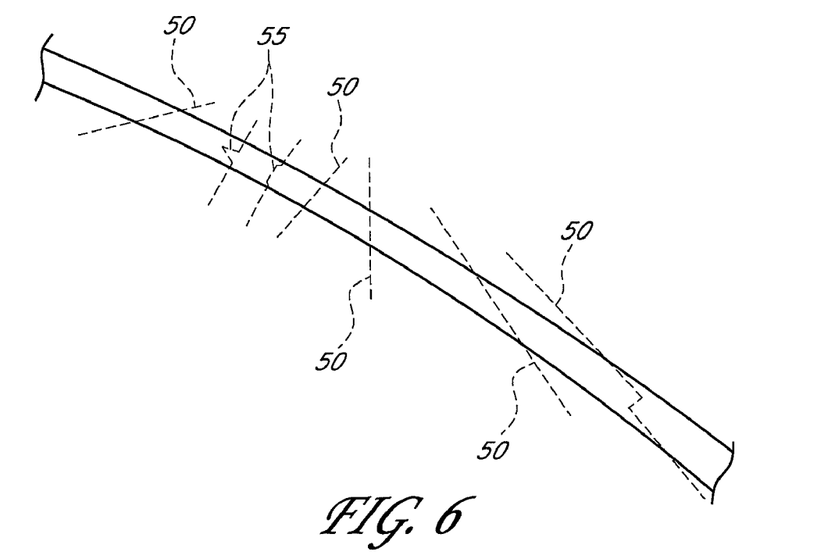
FIG. 6 illustrates several embodiments of interface geometries between a hard section and soft section of a hybrid hard-soft contact lens constructed according to the present invention.

Referring to FIG. 6, methods of coupling the hard section of the contact lens to the soft section will now be described. Conventional hybrid contact lenses are generally not durable, in part because of the fragile connection between the hard and soft sections of the lens. One feature of the present invention is that a variety of coupling configurations are contemplated that securely couple the hard and soft sections of a hybrid contact lens.

One embodiment of the present invention employs an angled, or sloped surface between the hard and soft contact lens sections, thereby increasing the surface area, and thus the bonding force, or strength between the two sections. Other embodiments use a variety of different surface features, or surface geometries that increase the durability and comfort of a hybrid contact lens.

For example, the bonding angle 50, shown in FIG. 6, may vary from almost 0 degrees to almost 90 degrees. That is, if a contact lens constructed according to the present invention was pressed against a flat surface, the angle defined by the interface between the hard and soft sections of the lens could vary from almost parallel to the flat surface to almost perpendicular to the flat surface.

In addition, the interface between the hard and soft sections of the contact lens may include a variety of surface configurations, or geometries 55. As shown in FIG. 6, these surface geometries 55 may include ledges, protuberances, or substantially V- or W-shaped projections. Other surface geometries 55 may include serrations, gradations, or any other shape that is not substantially straight, or planar.

Figure 6A:
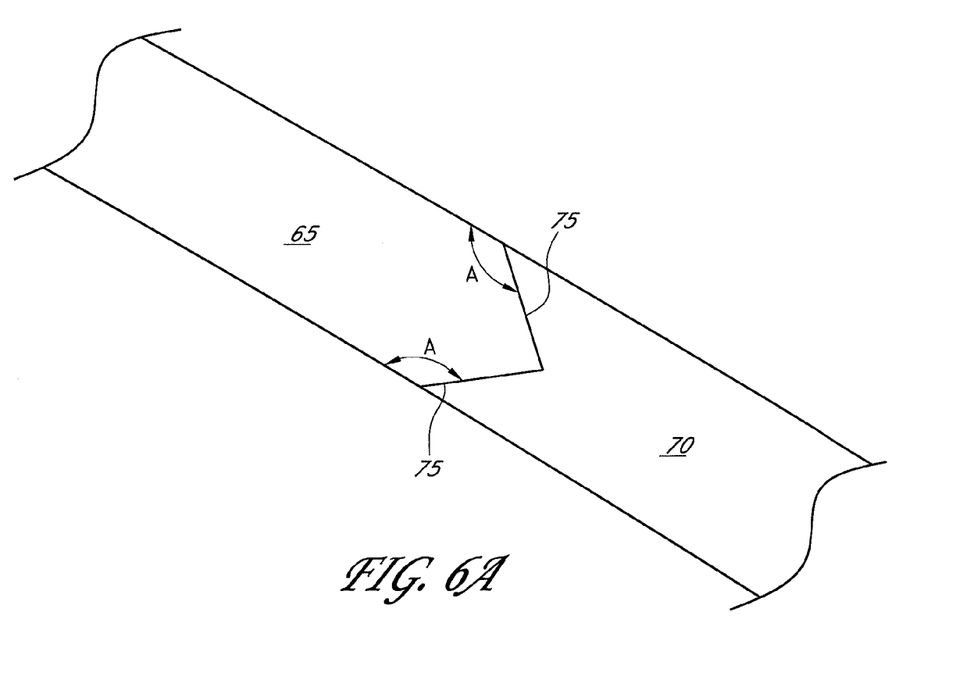
FIG. 6A illustrates a preferred embodiment of an interface geometry between a hard section and soft section of a hybrid hard-soft contact lens constructed according to the present invention.

Referring now to FIG. 6A, a preferred hard-soft lens bonding method is illustrated. In this embodiment of the present invention, increasing the surface area between the rigid and soft lens components increases bonding strength between the two materials and minimizes lens breakage, or failure. Another advantage of this embodiment is that is provides a smooth transition between the rigid or hard, and soft materials. This produces an exceptionally comfortable lens.

As shown in FIG. 6A, an interface, or junction 75 between the hard, or substantially rigid lens material 65, and the soft lens material 70 is illustrated. Also shown is angle "A" that may range between about 95 degrees to about 170 degrees. In a preferred embodiment, angle A ranges between about 110 degrees to about 165 degrees. As illustrated, the interface between the hard, or substantially rigid lens material 65, and the soft lens material 70 is substantially V-shaped. Put differently, the interface comprises two intersecting planes that meet within the lens. This lens junction configuration provides a safety feature in the unlikely case of lens material separation during wear. Because of the V-shape, the edge of the hard lens material 65 is not "blade" shaped, and thus a sharp edge will not contact the cornea or eyelid, eliminating the risk of cuts, or abrasions.

The hard and soft sections of a contact lens constructed according to the present invention may be joined, or coupled by a bonding material or resin comprised of the following monomer mixtures or their derivatives: vinylacetate; trifluoroethanol; methacrylate; ethanediamine; 2-hydroxyethylmethacrylate (HEMA) and other esters of methacrylic acid formulated from acrylic bases; fluorine; silicone; fluorine/silicone; styrene and resultant polymers such as polystyrene; fluorine/styrene; and silicone/styrene.

The soft section of the contact lens constructed according to the present invention may be comprised of a variety of materials. These materials may include the following monomer mixtures or their derivatives: poly HEMA; hydroxyethyl acrylate; dihydroxypropyl methacrylate; polyethylaneglycol; acetoxysilane; trimethylesiloxy; ethyleneglycoldimethacrylate; phenylethyl acrylate; and polyethylene oxide. It will be appreciated to those skilled in the art that other types of materials may be employed.

Hybrid Contact Lens Surface Treatments

One feature of the present invention is that a variety of contact lens surface treatments are contemplated. These surface treatments may be added, for example, for the purpose of improving the comfort of the lens by means of improving the in-vivo wetting of the lens material. Another reason for using surface treatments is to create a uniform pre-lens tear film thickness. Variations in pre-lens tear film thickness induce aberrations while a uniform pre-lens tear film thickness allows the other aberration corrections to reach full effectiveness.

One embodiment of a hybrid contact lens constructed according to the present invention may include a surface treatment that provides uniform pre-lens tear film thickness between normal blinking action. These treatments may comprise one or more of the following embodiments: 1) Plasma—the lens is placed in the presence of gases that are modified by oscillating electromagnetic energy. This creates a surface oxidation that generate functional groups such as OH or NH on the lens surface, which make the lens surface more wettable; 2) Ionic surfactants—polar molecules are presented to the ionic lens surfaces with a resultant bonding of the molecules to the surface. An example is sodium dodecyl sulfide. The 12-carbon chain combined with lauryl sulfonic acid provides a substrate that supports a more uniform tear film thickness; 3) Non-ionic surfactants—The lens may be exposed to non-ionic surfactants that provide a film on the lens. An example is an ethylene glycol chain; 4) Soluble polymers—films of soluble polymers can be applied to the rigid gas permeable material after manufacturing. Examples are TEFLON and HEMA. Other types of surface treatments are also contemplated.

Methods of Prescribing and Fitting a Hybrid Contact Lens

The present invention also contemplates methods of prescribing and fitting a hybrid contact lens. One method relates to non-rotating lenses for correcting high order aberrations that include methods of placing the coordinates of the aberration measurement over the coordinates of the pupil. Another comprises methods of placing a multifocal over the coordinates of the pupil and customizing the design of the multifocal with measurements of high order aberrations and pupil size.

One method of prescribing and fitting a hybrid contact lens employs a set of precision hybrid lenses with either spherical, aspherical or toroidal posterior surfaces and spherical, aspherical or toroidal anterior surfaces. For a final monofocal lens, one embodiment contains a posterior aspherical surface and an anterior spherical surface. For a final multifocal lens one embodiment contains a posterior aspherical surface and an anterior aspherical surface.

One prescribing method of the present invention employs a central registration mark or marks concentric with the lens geometric center that are placed on either the anterior or posterior surfaces or within the matrix of either the rigid central portion, the intermediate adhesion enhancement zone or in the soft portion of a contact lens. In the preferred embodiment the rigid portion is at least 9 mm in diameter and a minimum of three marks are placed at a chord diameter of about 8 mm. In the preferred embodiment the diameter of the overall lens is approximately 14.0 mm.

A contact lens from the set with a posterior rigid surface that approximates the sagittal depth of the respective eye over the chord diameter of the rigid portion is placed on the eye and allowed to equilibrate. The degree of rotational and translational movement is observed. In the preferred embodiment the movement observed should be less than 5 degrees rotational and 0.3 mm translational. Upon determination that the movement meets the required limit the residual high and low order aberrations are measured through the lens along with the relative coordinates of the lens marks and the pupil margin, limbal margin or other anatomical features. In the preferred embodiment an instrument having the capability of detecting the lens marks and the pupil margin along with the residual high and low order aberrations is used.

An alternative embodiment of the present invention may include infrared-responsive marks, such as one or more registration marks, one or more concentric marks, or other suitable marks, which emit or reflect infrared light. For example, some types of wavefront aberrometers employ infrared light, which is generally in the form of a laser. During examination of an eye fitted with a hybrid hard-soft contact lens constructed according to the present invention, the infrared-reflecting marks in the hybrid lens will be easily visible, enabling simultaneous evaluation of registration error, as well as aberrations. In one embodiment, indocyan dye is employed, but it will be appreciated that other dyes, powders, or other types of infraredresponsive products may be employed.

Another method of prescribing and fitting a hybrid contact lens employs a set of precision rotating and non rotating hybrid contact lenses having known ocular surface profiles, optical corrections and thickness profiles. In one embodiment, the lenses contain circumferential marks in the mid periphery. A lens is selected and applied to the eye and allowed to equilibrate. The coordinates of the marks and the pupil are determined. The aberrations of the lens-eye system are measured. A mathematical model provides analysis of the known thickness profile, the registration error of the coordinates of the lens and the pupil, and the residual lens-eye aberrations to derive the computer numerically controlled lathe files for diamond turning a resultant thickness profile for a final contact lens having the same ocular surface profile.

For example, one prescribing and fitting method of the present invention may include the steps of: selecting the initial lens to conform to the shape of the underlying cornea; capturing an image of the circumferential marks and the pupil margin; measuring the residual low and high order aberrations of the lens-eye system; performing analysis utilizing the known ocular surface profile of the lens, the initial lens thickness profile, the registration error, and the residual lens-eye aberration error to determine the resultant files for generating a final contact lens.

Another method of prescribing and fitting a hybrid contact lens employs a set of contact lenses having a known central zone ocular surface geometry, thickness, anterior surface geometry and diameter. The preferred residual lens eye aberration correction and coordinate disparity are determined by clinical measurement, and the thickness profile variation is derived by computer modeling, or other methods, in order to specify a superiorly performing lens.

Yet another method of prescribing and fitting a hybrid contact lens employs a set of contact lenses with fixed ocular surface geometries, overall diameters and front surface geometries, over which clinical measurements are made from which the final prescription parameters are derived by computation, or other methods.

Another method of the present invention comprises correcting visual acuity deficiencies in presbyopia by reduction of the residual lens-eye aberrations. The method uses a set of hybrid contact lenses having a known ocular surface profile and thickness profile and containing circumferential marks for the purpose of registration of the final optical correction with the coordinates of the optical system of the eye. The method steps may include: selecting the initial lens to conform to the shape of the underlying cornea; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the pupil size and the residual lens-eye aberration error to determine prescription information for generating a final contact lens. In one embodiment of this method, the diameter of the near focused optical correction may be in the range of about 1.8 mm to about 4.0 mm.

Another method of the present invention employs a multifocal contact lens and corrects visual acuity deficiencies in presbyopia by reduction of the residual lens-eye aberrations. The method uses a set of multifocal hybrid contact lenses having a known ocular surface profile and thickness profile and containing circumferential marks for the purpose of registration of the final optical correction with the coordinates of the optical system of the eye. The method steps may include: selecting the initial lens to conform to the shape of the underlying cornea having a multifocal anterior surface; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the pupil size and the residual lens-eye aberration error to determine prescription information for generating a final multifocal contact lens. In one embodiment of this method, the diameter of the near focused optical correction may be in the range of about 1.8 mm to about 4.0 mm.

Another method of the present invention employs a multifocal contact lens and corrects visual acuity deficiencies in presbyopia by reduction of the residual lens-eye aberrations. This method also incorporates information relating to a light transmittance pattern. The method uses a set of multifocal hybrid contact lenses having a known ocular surface profile and thickness profile, light transmittance pattern, and containing circumferential marks for the purpose of registration of the final optical correction with the coordinates of the optical system of the eye. The method steps may include: selecting the initial lens to conform to the shape of the underlying cornea having a multifocal anterior surface; capturing an image of the circumferential marks and the pupil margin; measuring the size of the pupil in photopic, mesopic and/or scotopic illumination; measuring the residual low and high order aberrations of the lens-eye system; and performing analysis utilizing the known ocular surface profile, the initial lens thickness profile, the registration error, the light transmittance pattern, the pupil size and the residual lens-eye aberration error to determine prescription information for generating a final multifocal contact lens. In one embodiment of this method, the diameter of the near focused optical correction may be in the range of about 1.8 mm to about 4.0 mm.

The above-described methods of prescribing and/or fitting a hybrid contact lens may also employ additional method steps or additional devices. For example: the method of determining the difference in the coordinates of the center of the circumferential lens marks and the pupil margin may incorporate a reticle of a biomicroscope or a camera with subsequent manual or electronic digital image detection. In addition, the method of measuring the residual aberrations of the lens-eye system may incorporate Shack-Hartmann aberrometry, aberrometers utilizing Tscherning technology, laser ray-tracing or Talbot interferometry technology.

Correction for Various Components of the Visible Light Spectrum

Figure 7:
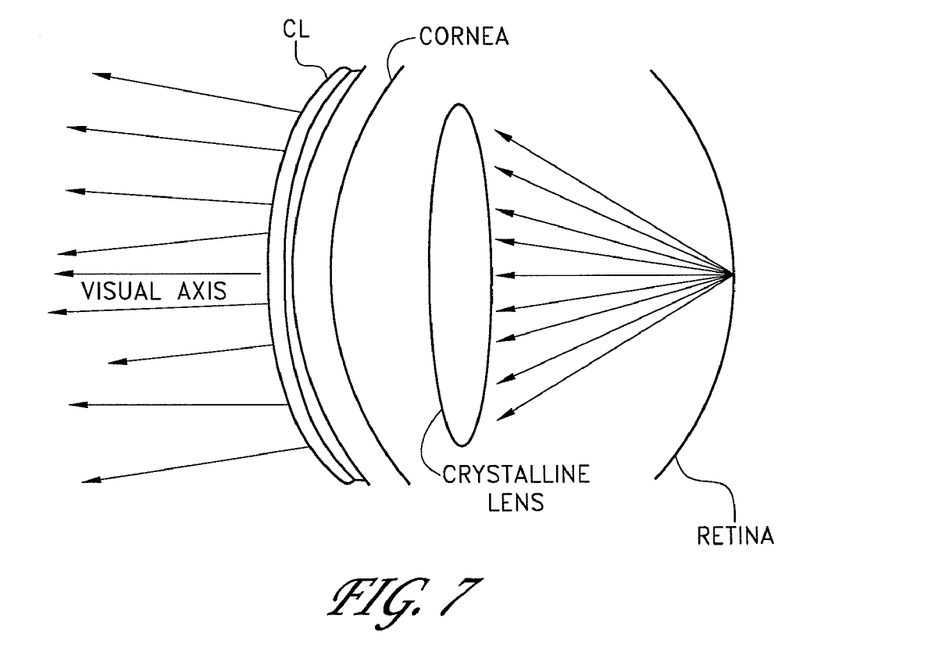
FIG. 7 is an illustration of a contact lens, several eye components and visible light rays exiting the eye-contact lens system.

Aberrometry performed with the contact lens in place provides us with knowledge of the angles that the rays emerging from the anterior lens make with respect to the visual axis. In the perfect case, the rays would all emerge parallel to the visual axis. But as illustrated in FIG. 7, in the presence of aberrations these rays make an angle with respect to the visual axis and this angle is not restricted to the plane of the paper. To correct these aberrations, there are generally two variables to play with. The first variable is the slope of the contact lens at the point each ray emerges from the contact lens. Changing this slope will change the direction of the ray exiting the eye via Snell's Law. There will exist a slope of the anterior contact lens surface that causes the ray to exit parallel to the visual axis. The second variable is the local lens thickness at the point where each ray exits the contact lens. As this thickness is adjusted, the slope of the surface at this point also needs to change in order to keep the emerging ray parallel to the visual axis. There will exist a set of local thicknesses and slopes that simultaneously cause all of the emerging rays to be parallel to the visual axis and keep the overall thickness of the lens reasonable, that is, not too thin or too thick.

Figure 8:
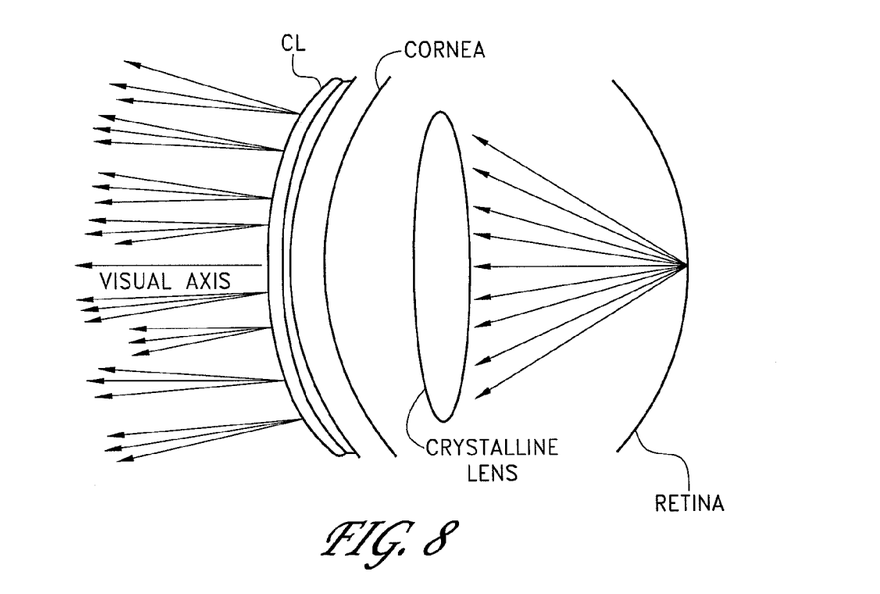
FIG. 8 is another illustration of a contact lens, eye components and visible light rays, showing the tendency for different colored light rays to exit the eye at different angles.

Aberrometry is normally only performed at one wavelength, usually in the infrared. However, as illustrated in FIG. 8, the slopes of the various rays will depend on the color of the light. In general, blue lights rays will be more convergent than the green light rays. The red light rays will be more divergent than the green light rays.

The dilemma now is which color rays should be made parallel to the visual axis. If the eye responded equally to all colors in the visible range (wavelengths of about 380 nanometers (nm) to about 780 nm), you would make the rays that corresponded to the middle wavelength parallel to the visual axis. In this manner, half of the light would be diverging and half of the light would be converging as it left the eye.

Figure 9:
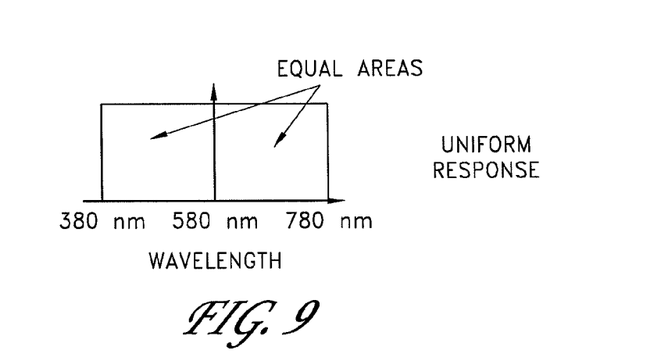
FIG. 9 illustrates a hypothetical uniform eye response to the visible light spectrum.

Referring to FIG. 9, for a uniform response, the center wavelength of the visible spectrum would be ideal for correcting aberrations since, the equal areas of the rectangles on either side of this wavelength means equal amounts of energy is distributed around this wavelength.

Figure 10:
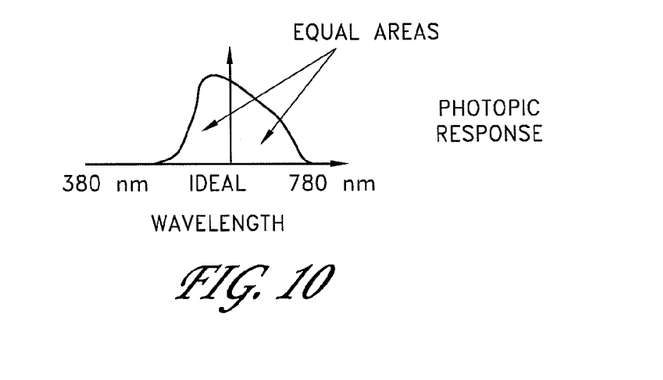
FIG. 10 illustrates a photopic eye response to the visible light spectrum.

However, the eye does not respond to all wavelengths the same. The photopic response curve, illustrated in FIG. 10, shows that the eye is more sensitive to the red/green end of the spectrum. The same sort of concept as described above can now be used to determine the ideal wavelength for correcting aberrations. The ideal wavelength gives equal areas under the photopic response curve on either side, as shown in FIG. 10.

Figure 11:
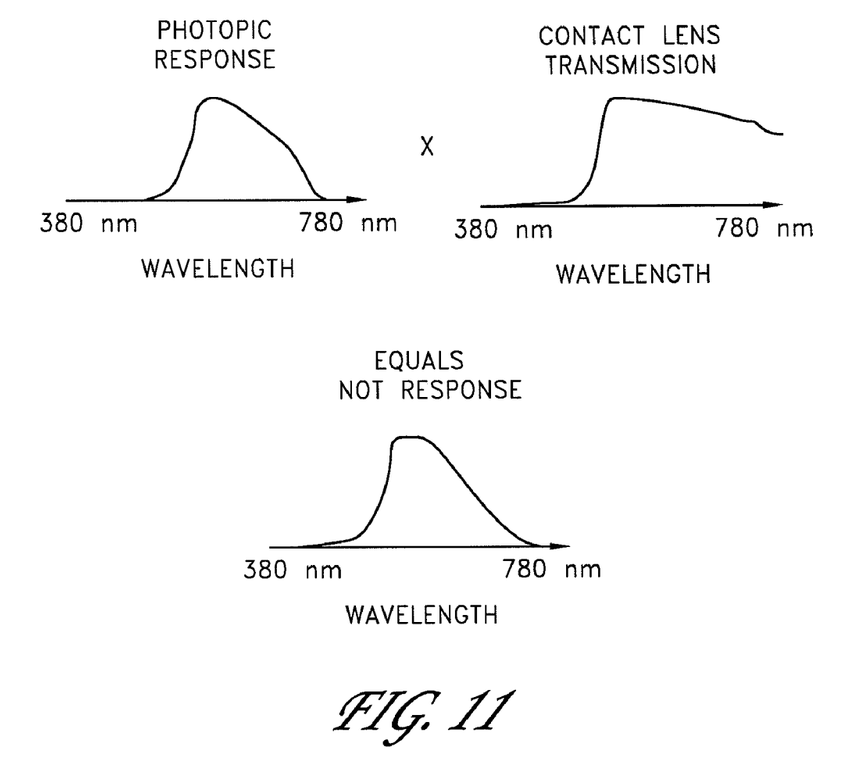
FIG. 11 illustrates one idealized net wavelength response for a contact lens constructed according to the present invention.

In addition to the variation in response of the eye to different colors, the present invention may also vary the transmission of the contact lens to different colors. This may be beneficial to reducing the effects of chromatic aberration in the eye. If the contact lens transmission is multiplied by the photopic response of the eye, a net response of the eye results, as illustrated in FIG. 11. One ideal wavelength is based on this net response which again gives equal areas under the curve. This ideal wavelength is then used as the target for correcting aberrations by the means described above.

For example, for either a final monofocal or multifocal lens, one embodiment hybrid contact lens constructed according to the present invention contains colorants that reduce the transmission at both the blue and red end of the visible spectrum thereby narrowing the band of transmitted light and potentially shifting the peak of the transmission curve of the lens. A contact lens of the present invention may therefore include color additives for the purpose of reducing light transmission, or color additives for the purpose of reducing chromatic aberration.

Thus, it is seen that a hybrid hard-soft contact lens system, method, and article of manufacture is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. It is noted that various equivalents for the particular embodiments discussed in this description may practice the invention as well.

What is claimed is:

1. A hybrid contact lens, comprising:
   a substantially rigid central portion having a DK value of at least $30 \times 10^{-11}$ (cm$^2$/sec)(mL O$_2$)/(mL×mm Hg); and
   a substantially flexible peripheral hydrophilic portion coupled to the substantially rigid central portion at a junction defined at an outer edge of the substantially rigid central portion;
   wherein the junction comprises an angled surface.

2. The hybrid contact lens of claim 1, wherein the angled surface comprises a substantially V-shaped surface.

3. The hybrid contact lens of claim 1, wherein the angled surface ranges between about 95 degrees to about 170 degrees.

4. The hybrid contact lens of claim 1, wherein the substantially rigid portion has a diameter that ranges between about 4.0 millimeters to about 12.0 millimeters.

5. The hybrid contact lens of claim 1, wherein the substantially flexible portion has an outer diameter that ranges between about 10.0 millimeters to about 18.0 millimeters.

6. The hybrid contact lens of claim 1, wherein the substantially rigid portion has an oxygen permeability DK value that may range between about $30 \times 10^{-11}$ (cm$^2$/sec) (mL O$_2$)/(mL×mm Hg) to about $250 \times 10^{-11}$ (cm$^2$/sec) (mL O$_2$) (mL×mm Hg).

7. The hybrid contact lens of claim 1, wherein the substantially rigid portion is comprised of a material selected from a group consisting of: fluoro-siloxane acrylate, siloxane acrylate, poly-stryene siloxane acrylate, fluorosilixane acrylate RGP, trimethythyl-siloxyl, methyl-methacrylate, ethyl-methacrylate, ethylene glycol di-met6hacrylate, octafluoro pentyl-methacrylate, tetra-methydisiloxane, ethylene glycol di-methacrylate, pentafluoro phenylacrylate, 2-(trimethylsiloxyl) methacrylate, bix(2-metharyloxyphenyl) propane, N-[2-N,N-dimethylamino)ethyl], onethacrylate, N-[2-(n,n-dimethylamino)ethy], methacrylate, vinylpyrolidone, N,N-dimathacrylamide, acrylamine, hydroxyethyl methacrylate, siloxane ethylene glycol di-methacrylate, trifluoroethyl methacrylate, pentafluorostyrene, pentafluoropropyl methacrylate, unsaturated polyester; p-vinyl benzyl hexafluoroisopropyl ether, and siloxanylalkylamide.

8. The hybrid contact lens of claim 1, wherein the substantially flexible portion is comprised of a material selected from a group consisting of: poly-2-hydroxyethyl-methacrylate; poly HEMA; hydroxyethyl acrylate; dihydroxypropyl methacrylate; polyethylaneglycol; acetoxysilane; trimethylesiloxy; ethyleneglycol-dimethacrylate; phenylethyl acrylate; and polyethylene oxide.

9. The hybrid contact lens of claim 1, wherein the hybrid contact lens is constructed to include a prescription obtained from a wavefront aberrometer.

10. The hybrid contact lens of claim 1, wherein the hybrid contact lens is constructed to include a prescription for presbyopia.

11. A hybrid contact lens, comprising:
    a substantially rigid central portion having a DK value of at least $30 \times 10^{-11}$ (cm$^2$/sec) (mL O$_2$)/ (mL×mm Hg); and
    a substantially flexible peripheral hydrophilic portion coupled to the substantially rigid central portion at a junction defined at an outer edge of the substantially rigid central portion, a distance between an outer edge of the substantially flexible peripheral hydrophilic portion and the outer edge of the substantially rigid central portion being greater than 1 mm;
    wherein the junction comprises at least two intersecting planes.

12. The hybrid contact lens of claim 11, wherein the junction comprises a substantially V-shaped surface.

13. The hybrid contact lens of claim 11, wherein the substantially rigid portion has a diameter that ranges between about 4.0 millimeters to about 12.0 millimeters.

14. The hybrid contact lens of claim 11, wherein the substantially flexible portion has an outer diameter that ranges between about 10.0 millimeters to about 18.0 millimeters.

15. The hybrid contact lens of claim 11, wherein the substantially rigid portion has a DK value between $30 \times 10^{-11}$ (cm$^2$/sec)(mL O$_2$)/(mL×mm Hg) and $250 \times 10^{-11}$ (cm$^2$/sec) (mL O$_2$)/(mL×mm Hg).

16. The hybrid contact lens of claim 11, wherein the substantially rigid portion is comprised of a material selected from a group consisting of: fluoro-siloxane acrylate, siloxane acrylate, poly-styrene siloxane acrylate, fluorosiloxane acrylate RGP, trimeththyl-siloxyl, methyl-methacrylate, ethyl-methacrylate, ethylene glycol di-methacrylate, octafluoro pentyl-methacrylate, tetra-methyldisiloxane, ethylene glycol di-methacrylate, pentafluoro phenylacrylate, 2-(trimethylsiloxyl) methacrylate, bis(2-metharyloxyphenyl) propane, N-[2-(N,N-dimethylamino)ethyl], onethacrylate, N-[2-(n,n-dimethylamino)ethy], methacrylate, vinylpyrolidone, N,N-dimathacrylamide, acrylamine, hydroxyethyl methaciylate, siloxane ethylene glycol di-methacrylate, trifluoroethyl methacrylate, pentafluorostyrene, pentafluoropropyl methacrylate, unsaturated polyester; p-vinyl benzyl hexafluoroisopropyl ether, and siloxanylalkylamide.

17. The hybrid contact lens of claim 11, wherein the substantially flexible portion is comprised of a material selected from a group consisting of: poly-2-hydroxyethylmethacrylate; poly HEMA; hydroxyethyl acrylate; dihydroxypropyl methacrylate; polyethylaneglycol; acetoxysilane; trimethylesiloxy; ethyleneglycol-dimethacrylate; phenylethyl acrylate; and polyethylene oxide.

18. The hybrid contact lens of claim 11, wherein the hybrid contact lens is constructed to include a prescription obtained from a wavefront aberrometer.

19. The hybrid contact lens of claim 1, wherein the hybrid contact lens is constructed to include a prescription for presbyopia.

20. A hybrid contact lens, comprising:
    a substantially rigid central portion having a gas permeability value of at least $30 \times 10^{-11}$ (cm$^2$/sec)(mL O$_2$)/(mL×mm Hg); and
    a substantially flexible annular hydrophilic portion coupled to the substantially rigid central portion at a junction defined at an outer edge of the substantially rigid central portion.

21. The hybrid contact lens of claim 20, wherein the substantially rigid portion has a diameter that ranges between 4.0 millimeters and 12.0 millimeters.

22. The hybrid contact lens of claim 20, wherein the substantially flexible portion has an outer diameter that ranges between 10.0 millimeters and 18.0 millimeters.

23. The hybrid contact lens of claim 20, wherein the substantially rigid portion has a gas permeability value between $30 \times 10^{-11}$ (cm$^2$/sec)(mL O$_2$)/(mL ×mm Hg) and $250 \times 10^{-11}$ (cm$^2$/sec)(mL O$_2$)/(mL×mm Hg).

24. The hybrid contact lens of claim 20, wherein the substantially rigid portion is comprised of a material selected from a group consisting of: fluoro-siloxane acrylate, siloxane acrylate, poly-styrene siloxane acrylate, fluorosiloxane acrylate RGP, trimeththyl-siloxyl, methyl-methacrylate, ethyl-methacrylate, ethylene glycol di-methacrylate, octafluoro pentyl-methacrylate, tetra-methyldisiloxane, ethylene glycol di-methacrylate, pentafluoro phenylacrylate, 2-(trimethylsiloxyl) methacrylate, bis(2-methayloxyphenyl) propane, N-[2-(N,N-dimethylamino)ethyl], onethacrylate, N-[2-(n,n-dimethylamino)ethy], methacryalte, vinylpyrolidone, N,N-dimathacrylamide, acrylamine, hydroxyethyl methacrylate, siloxane ethylene glycol di-methacrylate, trifluoroethyl methacrylate, pentafluorostyrene, pentafluoropropyl methacrylate, unsaturated polyester; p-vinyl benzyl hexafluoroisopropyl ether, and siloxanylalkylamide.

25. The hybrid contact lens of claim 20, wherein the substantially flexible portion is comprised of a material selected from a group consisting of: poly-2-hydroxyethylmethacrylate; poly HEMA; hydroxyethyl acrylate; dihydroxypropyl methacrylate; polyethylaneglycol; acetoxysilane; trimethylesiloxy; ethyleneglycol-dimethacrylate; phenylethyl acrylate; and polyethylene oxide.

26. The hybrid contact lens of claim 20, wherein the hybrid contact lens is constructed to include a prescription obtained from a wavefront aberrometer.

27. The hybrid contact lens of claim 20, wherein the hybrid contact lens is constructed to include a prescription for presbyopia.

28. The hybrid contact lens of claim 20, wherein a distance between an outer edge of the substantially flexible annular hydrophilic portion and the outer edge of the substantially rigid central portion is between 1 mm and 14 mm.

29. The hybrid contact lens of claim 11, wherein the distance between the outer edge of the substantially flexible peripheral hydrophilic portion and the outer edge of the substantially rigid central portion is between 1 mm and 14 mm.

* * * * *

UNITED STATES PATENT AND TRADEMARK OFFICE
CERTIFICATE OF CORRECTION

PATENT NO. : 7,097,301 B2
APPLICATION NO. : 10/657061
DATED : August 29, 2006
INVENTOR(S) : Jerome Legerton et al.

It is certified that error appears in the above-identified patent and that said Letters Patent is hereby corrected as shown below:

Title Page, Item (57) (Abstract), line 5, delete "though" and insert -- through --, therefor.

At column 1, line 58, delete "though" and insert -- through --, therefor.

Figure 2:
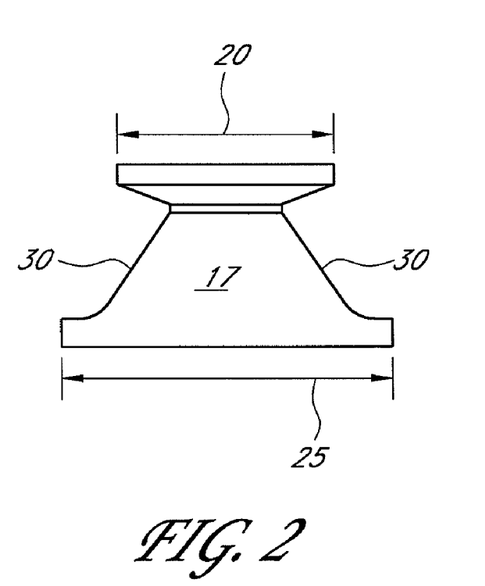
FIG. 2. is a front view of a contact lens blank after the manufacturing step illustrated in FIG. 1.
Figure 3:
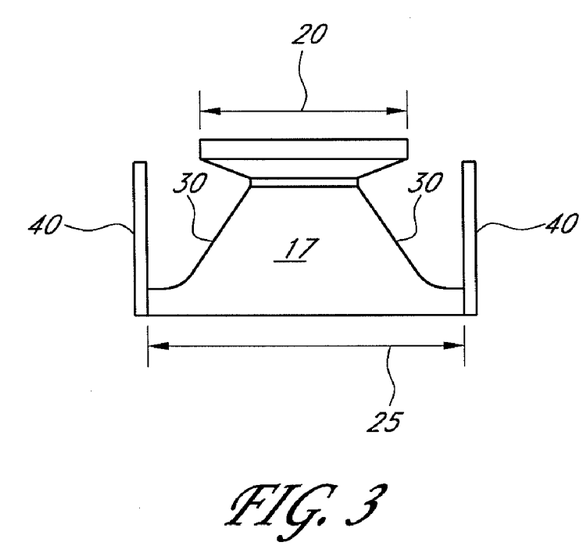
FIG. 3 is a front view of another manufacturing step used to construct a hybrid hard-soft contact lens of the present invention.

At column 2, line 6, delete "FIG. 2." and insert -- FIG. 2 --, therefor.

At column 3, line 63, delete "polystryene" and insert -- poly-styrene --, therefor.

At column 6, line 10, delete "trimeththylsiloxyl;" and insert -- trimethyl-siloxyl; --, therefor.

At column 6, line 16, delete "ethy]," and insert -- ethyl], --, therefor.

At column 6, lines 16-17, delete "methacryalte," and insert -- methacrylate, --, therefor.

At column 6, line 17, delete "dimathacrylamide," and insert -- dimethacrylamide, --, therefor.

At column 8, line 30, delete "polystyrene;" and insert -- poly-styrene; --, therefor.

At column 9, line 63, delete "infraredresponsive" and insert -- infrared-responsive --, therefor.

At column 13, line 25, in Claim 6, after "(mL $O_2$)" insert -- / --.

At column 13, line 30, in Claim 7, delete "poly-stryene" and insert -- poly-styrene --, therefor.

UNITED STATES PATENT AND TRADEMARK OFFICE
CERTIFICATE OF CORRECTION

PATENT NO.        : 7,097,301 B2
APPLICATION NO.   : 10/657061
DATED             : August 29, 2006
INVENTOR(S)       : Jerome Legerton et al.

It is certified that error appears in the above-identified patent and that said Letters Patent is hereby corrected as shown below:

At column 13, lines 30-31, in Claim 7, delete "fluorosilixane" and insert -- fluorosiloxane --, therefor.

At column 13, line 31, in Claim 7, delete "trimeththyl" and insert -- trimethyl --, therefor.

At column 13, line 32, in Claim 7, delete "di-met6hacrylate," and insert -- di-methacrylate, --, therefor.

At column 13, line 33, in Claim 7, delete "methydisiloxane," and insert -- methyldisiloxane, --, therefor.

At column 13, line 35, in Claim 7, delete "bix" and insert -- bis --, therefor.

At column 13, line 36, in Claim 7, delete "N-[2-N,N" and insert -- N-[2-(N,N --, therefor.

At column 13, line 37, in Claim 7, delete "ethy]," and insert -- ethyl], --, therefor.

At column 13, line 38, in Claim 7, delete "dimathacrylamide," and insert -- dimethacrylamide, --, therefor.

At column 14, line 20, in Claim 16, delete "trimeththyl" and insert -- trimethyl --, therefor.

At column 14, line 26, in Claim 16, delete "ethy]," and insert -- ethyl], --, therefor.

UNITED STATES PATENT AND TRADEMARK OFFICE
CERTIFICATE OF CORRECTION

PATENT NO. : 7,097,301 B2
APPLICATION NO. : 10/657061
DATED : August 29, 2006
INVENTOR(S) : Jerome Legerton et al.

It is certified that error appears in the above-identified patent and that said Letters Patent is hereby corrected as shown below:

At column 14, line 27, in Claim 16, delete "dimathacrylamide," and insert -- dimethacrylamide, --, therefor.

At column 14, line 28, in Claim 16, delete "methaciyalte," and insert -- methacrylate, --, therefor.

At column 15, line 1, in Claim 24, delete "trimeththyl" and insert -- trimethyl --, therefor.

At column 15, line 7, in Claim 24, delete "ethy]," and insert -- ethyl], --, therefor.

At column 15, line 7, in Claim 24, delete "methacryalte," and insert -- methacrylate, --, therefor.

At column 15, line 8, in Claim 24, delete "dimathacrylamide," and insert -- dimethacrylamide, --, therefor.

Signed and Sealed this

Eighth Day of May, 2007

JON W. DUDAS
*Director of the United States Patent and Trademark Office*